United States Patent Office 2,855,286
Patented Oct. 7, 1958

2,855,286

PROCESS AND COMPOSITION FOR REDUCING CORROSION OF METALS

Edward William Harvey, Highland Park, N. J., assignor to Allied Chemical Corporation, New York, N. Y., a corporation of New York No Drawing. Application August 19, 1955
Serial No. 529,573

20 Claims. (Cl. 71—29)

My invention relates to a process for protecting both ferrous and aluminum metals against corrosion by aqueous solutions of ammonium nitrate containing little or no free ammonia, and which may contain urea or sodium nitrate in addition to the ammonium nitrate.

That process involves incorporating in those aqueous ammonium nitrate solutions a limited, small amount of a compound of $P_2O_5$, such as phosphoric acid or phosphate salts, soluble to at least a small degree in the aqueous ammonium nitrate solutions. My invention further includes those aqueous solutions of ammonium nitrate containing in solution a compound of $P_2O_5$ which have low corrosiveness to both ferrous and aluminum metals.

Aqueous solutions of ammonium nitrate alone or also containing urea or sodium nitrate have been found particularly suitable for manufacture and use as fertilizer materials either by direct application to the soil or in the preparation of other fertilizer compositions. Such solutions are, in general, quite corrosive toward the ferrous metals, such as mild and carbon steels. Though they attack aluminum metals, aluminum and its alloys, much less rapidly than ferrous metals, they have at times an unduly high corrosive action on most aluminum metals. Strongly ammoniacal ammonium nitrate solutions are relatively noncorrosive toward aluminum and its alloys, but they rapidly corrode the ferrous metals. These strongly ammoniacal solutions have found use in the fertilizer trade, and the problem of their corrosion of equipment in which they are handled has been met by incorporating in the strongly ammoniacal solutions certain corrosion inhibitors, or by using equipment of which the parts contacted by the solution are of aluminum or its alloys. Since the same type equipment is usable both for the strongly ammoniacal fertilizer solutions and the aqueous solutions containing little or no free ammonia, the marketing and use of the latter solutions has presented the problem of preventing undue corrosion of equipment already in use for handling other fertilizer solutions, in which the solutions are contacted at various times with ferrous metals and with aluminum metals.

I have discovered that by incorporating in the aqueous ammonium nitrate fertilizer solutions containing little or no free ammonia, a $P_2O_5$ compound in limited, small amounts, the corrosion of ferrous metal by the solutions may be greatly reduced. While it is known that solutions of phosphates are very corrosive toward aluminum, I have found the limited amounts used in carrying out my invention not only do not substantially increase, but in general substantially decrease the rate of corrosion of the aluminum metals.

My invention comprises incorporating in an aqueous ammonium nitrate solution containing at least 20%, preferably at least 30%, ammonium nitrate, at least 15% water, less than 1% free ammonia, and the balance substantially consisting of urea or sodum nitrate or both urea and sodium nitrate, 0.02% to 2%, preferably 0.05% to 1% $P_2O_5$ in the form of a compound of phosphate soluble in the aqueous solution, to protect ferrous and aluminum metals with which the solution is contacted, against corrosion. Solutions thus prepared contain as essential ingredients ammonium nitrate, water and the phosphate and permissibly contain as additional fertilizer materials as much urea or sodium nitrate or both urea and sodium nitrate as may be required for the sum of the percentages of these essential and permissible compounds to amount to substantially 100% by weight of the solution. My invention further comprises the aqueous ammonium nitrate solutions of the foregoing composition, of low corrosiveness toward ferrous and aluminum metals because of the presence of the $P_2O_5$ compound.

With respect to the $P_2O_5$ compound which may be utilized in carrying out my invention, the most commonly available are the free phosphoric acids (hydrogen phosphates) and the phosphate salts (as the ortho, meta or pyro compounds) soluble to the required degree in the ammonium nitrate solutions. From an economic standpoint, the presence of ammonium phosphate and the permissible small amount of free ammonia in the solution increases its fertilizer value. Accordingly, an ammonium phosphate is the preferred material employed in carrying out my invention, either by dissolving in the solution an ammonium phosphate or by adding to the ammonium nitrate solution a phosphoric acid and at least enough free ammonia to react with the phosphoric acid. On the other hand, the invention is not limited to the neutral or slightly ammoniacal ammonium nitrate solutions, but is applicable to solutions which are acidic and in which phosphoric acid added to the solution may remain as free phosphoric acid or, in the case of solutions containing urea, may be in the form of a urea-phosphate.

The presence of the $P_2O_5$ compound in the aqueous ammonium nitrate solutions serves to protect against corrosion ferrous metals and aluminum and its alloys which are attacked by these solutions. Metals commonly used in equipment for handling fertilizer solutions which are protected against corrosion by my invention include the mild and carbon steels, substantially pure aluminum (over 99%) and aluminum containing up to about 5% of alloying elements, principally silicon, manganese, magnesium, or chromium, or combinations of these, and the aluminum alloys with a copper content not above about 0.25%.

The following examples are illustrative of my invention. In these examples the amounts of materials given in percentages are by weight of the ammonium nitrate solutions.

Solutions of (A) 60% ammonium nitrate, 40% water and (B) 44.3% ammonium nitrate, 35.4% urea and 20.3% water, were prepared. A portion of each solution was reserved without further additions, and to other portions were added monoammonium phosphate and diammonium phosphate in ratios equivalent to the formula $(NH_4)_{1.6}H_{1.4}PO_4$. There was thus incorporated in several portions of solutions (A) and (B) 0.1% and 1% of the ammonium phosphate; the 1% addition not dissolving completely in solution (B). Mild steel and an alloy of aluminum of the composition 1.2% manganese, balance aluminum and normal impurities, were activated by contact with 10% hydrochloric acid solution and rinsing with water. The activated metals were placed in contact with the several solutions at room temperatures. At the end of 30 days' contact with the solutions, the rates of corrosion in mils average penetration per year were determined from the loss of weight of the metal. The following Table I shows the relative rates of corrosion of these metals by the solutions. The amount of added ammonium phosphate which went into solution is given in percent $P_2O_5$.

Table I

MILD STEEL

| Solution | Percent $P_2O_5$ | Penetration, Mils/year |
|---|---|---|
| A | None | 8.8 |
|   | 0.057 | 0.48 |
|   | 0.57 | 0.22 |
| B | None | 22.00 |
|   | 0.057 | 0.49 |
|   | 0.525 | 0.12 |

ALUMINUM ALLOY

| Solution | Percent $P_2O_5$ | Penetration, Mils/year |
|---|---|---|
| A | None | 0.15 |
|   | 0.057 | 0.09 |
|   | 0.57 | 0.068 |
| B | None | 0.15 |
|   | 0.057 | 0.063 |
|   | 0.525 | 0.10 |

It is noted that the aluminum alloy of the above tests had a relatively high resistance to corrosion by both solutions in the absence of the ammonium phosphate. Even so, the $P_2O_5$ reduced its corrosion rate as well as that of the iron.

To portions of (C) a 60% solution of ammonium nitrate in water containing 0.03% free ammonia; (D) a solution of 44.3% ammonium nitrate and 35.4% urea in water containing 0.2% free ammonia; and (E) a solution containing 47.5% ammonium nitrate and 20.5% sodium nitrate in water, phosphoric acid was added. In the cases of solutions (C) and (E) ammonia was added sufficient for formation of ammonium phosphate. Also, to (F) a solution containing 44.3% ammonium nitrate and 35.4% urea in water and 0.06% free ammonia; and (G) a solution of 60% ammonium nitrate in water containing less than 0.02% free ammonia, phosphoric acid was added to incorporate 0.057% $P_2O_5$ in these solutions. Carbon steel, first activated by hydrochloric acid solution, and an alloy of aluminum of the composition 3.5% manganese, 0.25% chromium and the balance aluminum and normal impurities, were contacted for 30 days at room temperatures with these solutions while maintaining the solutions in constant agitation. The resulting corrosion rates are shown in the following Table II:

Table II

CARBON STEEL

| Solution | Percent $P_2O_5$ | Penetration, Mils/year | |
|---|---|---|---|
|   |   | 1st 7 days | Entire 30 days |
| C | None | 97 | 54 |
|   | 0.057 | 3.8 | 3.5 |
|   | 0.285 | 1.7 | 1.8 |
| D | None | 143 | 97 |
|   | 0.057 | 0.77 | 2.8 |
|   | 0.285 | 2.3 | 1.4 |
| E | None | 30 | 36 |
|   | 0.057 | 2.1 | 5.6 |
|   | 0.285 | 1.8 | 1.1 |

ALUMINUM ALLOY

| Solution | Percent $P_2O_5$ | 1st 7 days | Entire 30 days |
|---|---|---|---|
| F | None | 8.5 | 2.9 |
|   | 0.057 | 6.5 | 2.2 |
| G | None | 4.3 | 1.6 |
|   | 0.057 | 1.6 | 1.4 |

The data in the following Table III was obtained in contacting for 30 days a mild steel with a 60% ammonium nitrate, 40% water solution containing less than 0.02% free ammonia, in which 0.1% $P_2O_5$ was incorporated in the forms indicated in the table. In these tests the solutions were not agitated. The table further shows the influence on corrosion rates by the presence of increasing amounts of free amonia added to this solution.

Table III

| Inhibitor | Added Ammonia | Penetration, Mils/year | |
|---|---|---|---|
|   |   | 1st 7 days | Entire 30 days |
| None | None | 29 | 17 |
| $NH_4H_2PO_4$ | None | 4.6 | 3.2 |
| $Na_2HPO_4$ | None | 1.2 | 0.9 |
| $Na_3PO_4$ | None | 1.6 | 0.7 |
| $(NH_4)_2HPO_4$ | None | 1.2 | 0.9 |
| $(NH_4)_2HPO_4$ | 0.152 | 1.2 | 0.5 |
| $(NH_4)_2HPO_4$ | 0.952 | 18 | 4.3 |
| $(NH_4)_2HPO_4$ | 4.952 | 219 | 50 |

I claim:
1. The process for controlling corrosiveness to ferrous and aluminum metals of a solution of ammonium nitrate in water, said solution containing at least 20% ammonium nitrate, at least 15% water and not more than 1% free ammonia, and the balance substantially consisting of material selected from the group consisting of sodium nitrate and urea and mixtures thereof, which process comprises incorporating in said solution 0.02% to 2% by weight $P_2O_5$ in the form of a phosphate dissolved in said ammonium nitrate solution.

2. The process of claim 1 in which 0.02% to 2% by weight $P_2O_5$ in the form of an inorganic phosphate is dissolved in the ammonium nitrate solution.

3. The process of claim 2 wherein the solution in which the compound of $P_2O_5$ is dissolved substantially consists of ammonium nitrate, water and no more than 1% free ammonia.

4. The process of claim 2 wherein the solution in which the compound of $P_2O_5$ is dissolved substantially consists of ammonium nitrate, urea, water and no more than 1% free ammonia.

5. The process of claim 2 in which the solution wherein the compound of $P_2O_5$ is dissolved substantially consists of ammonium nitrate, sodium nitrate, water and no more than 1% free ammonia.

6. The process of claim 2 in which 0.05% to 1% $P_2O_5$ is incorporated in the ammonium nitrate solution.

7. The process of claim 3 in which 0.05% to 1% $P_2O_5$ is incorporated in the ammonium nitrate solution.

8. The process of claim 4 in which 0.05% to 1% $P_2O_5$ is incorporated in the ammonium nitrate-urea solution.

9. The process of claim 5 in which 0.05% to 1% $P_2O_5$ is incorporated in the ammonium nitrate-sodium nitrate solution.

10. As a new composition of matter of low corrosiveness toward ferrous metals and aluminum and its alloys a solution of ammonium nitrate in water containing at least 20% ammonium nitrate, at least 15% water, less than 1% free ammonia, 0.02% to 2% by weight $P_2O_5$ in the form of a phosphate dissolved in said solution, and the balance substantially consisting of materials selected from the group consisting of sodium nitrate and urea.

11. A composition of claim 10 in which the phosphate in the ammonium nitrate solution is an inorganic phosphate.

12. The composition of claim 11 in which the solution wherein the compound of $P_2O_5$ is dissolved substantially consists of ammonium nitrate, water and no more than 1% free ammonia.

13. The composition of claim 11 in which the solution wherein the compound of $P_2O_5$ is dissolved substantially consists of ammonium nitrate, urea, water and no more than 1% free ammonia.

14. The composition of claim 11 in which the solution wherein the compound of $P_2O_5$ is dissolved substantially consists of ammonium nitrate, sodium nitrate, water and no more than 1% free ammonia.

15. The composition of claim 11 in which 0.05% to

1% $P_2O_5$ is incorporated in the ammonium nitrate solution.

16. The composition of claim 12 in which 0.05% to 1% $P_2O_5$ is incorporated in the ammonium nitrate solution.

17. The composition of claim 13 in which 0.05% to 1% $P_2O_5$ is incorporated in the ammonium nitrate-urea solution.

18. The composition of claim 14 in which 0.05% to 1% $P_2O_5$ is incorporated in the ammonium nitrate-sodium nitrate solution.

19. The process of claim 1 in which 0.05% to 1% $P_2O_5$ is incorporated in the ammonium nitrate solution.

20. The composition of claim 10 in which 0.05% to 1% $P_2O_5$ is incorporated in the ammonium nitrate solution.

References Cited in the file of this patent

UNITED STATES PATENTS

| | | |
|---|---|---|
| 1,834,454 | Johnson | Dec. 1, 1931 |
| 2,022,677 | Kniskern | Dec. 3, 1935 |
| 2,056,283 | Lawrence et al. | Oct. 6, 1936 |
| 2,080,299 | Benning et al. | May 11, 1937 |
| 2,618,604 | Schaeffer | Nov. 18, 1952 |
| 2,665,995 | Bishop | Jan. 12, 1954 |